United States Patent
Weber

(10) Patent No.: US 10,962,079 B2
(45) Date of Patent: Mar. 30, 2021

(54) HYDROPNEUMATIC PISTON-CYLINDER ASSEMBLY

(71) Applicant: HYDAC TECHNOLOGY GMBH, Sulzbach/Saar (DE)

(72) Inventor: Norbert Weber, Saarbruecken (DE)

(73) Assignee: HYDAC TECHNOLOGY GMBH, Sulzbach/Saar (DE)

(*) Notice: Subject to any disclaimer, the term of this patent is extended or adjusted under 35 U.S.C. 154(b) by 5 days.

(21) Appl. No.: 16/462,999

(22) PCT Filed: Nov. 22, 2017

(86) PCT No.: PCT/EP2017/001364
§ 371 (c)(1),
(2) Date: May 22, 2019

(87) PCT Pub. No.: WO2018/103881
PCT Pub. Date: Jun. 14, 2018

(65) Prior Publication Data
US 2019/0331191 A1    Oct. 31, 2019

(30) Foreign Application Priority Data
Dec. 10, 2016 (DE) ............ 10 2016 014 779.2

(51) Int. Cl.
*F16F 9/48* (2006.01)
*F16F 9/32* (2006.01)
(Continued)

(52) U.S. Cl.
CPC ............ *F16F 9/32* (2013.01); *B60G 15/12* (2013.01); *B60G 2202/154* (2013.01);
(Continued)

(58) Field of Classification Search
CPC .... F16F 9/062; F16F 9/065; F16F 9/32; F16F 9/49; F16F 9/56; F16F 9/48; B60G 15/12
(Continued)

(56) References Cited

U.S. PATENT DOCUMENTS 2,614,833 A * 10/1952 Laugaudin ............. F16F 9/063
 267/64.15
2,679,827 A * 6/1954 Perdue .................... F01B 17/02
 92/8

(Continued)

FOREIGN PATENT DOCUMENTS

CN 106090103 11/2016
DE 1 124 372 2/1962
(Continued)

OTHER PUBLICATIONS

International Search Report dated Feb. 23, 2018 in International (PCT) Application No. PCT/EP2017/001364.

*Primary Examiner* — Christopher P Schwartz
(74) *Attorney, Agent, or Firm* — Wenderoth, Lind & Ponack, L.L.P.

(57) ABSTRACT

A hydropneumatic piston-cylinder assembly, in particular for use as a suspension strut in vehicle suspension systems, includes a cylinder housing (4) and a piston (14) guided for axial movement in the cylinder chamber (12) of the cylinder housing. The cylinder chamber is filled with a hydraulic fluid. The piston has a piston rod (24) on one piston side (20). The piston rod extends out of an end of the cylinder chamber (12) in a sealed manner. The hydraulic fluid, which is located in the cylinder chamber (12) on the side of the piston crown (16) facing away from the piston rod (24), can be brought into operative connection with a pneumatic spring accumulator (10). The pneumatic spring accumulator is a piston-type accumulator (10), which is arranged in the cylinder housing (4).

19 Claims, 3 Drawing Sheets

(51) Int. Cl.
*B60G 15/12* (2006.01)
*F16F 9/06* (2006.01)

(52) U.S. Cl.
CPC .. *B60G 2202/412* (2013.01); *B60G 2202/413* (2013.01); *F16F 9/067* (2013.01)

(58) Field of Classification Search
USPC ...... 188/300, 314, 322.21; 267/64.11, 64.12, 267/64.28, 120, 124
See application file for complete search history.

(56) References Cited

U.S. PATENT DOCUMENTS

| | | | | |
|---|---|---|---|---|
| 2,992,864 | A * | 7/1961 | Bourcier | F16F 9/362 384/16 |
| 3,388,883 | A * | 6/1968 | Wossner | A47B 9/10 248/188.2 |
| 3,869,861 | A * | 3/1975 | Case | F15B 15/1457 60/413 |
| 4,166,612 | A * | 9/1979 | Freitag | F16F 9/49 188/284 |
| 4,307,874 | A * | 12/1981 | Reuschenbach | F16F 9/56 188/284 |
| 4,795,009 | A * | 1/1989 | Tanahashi | F16F 9/062 188/315 |
| 7,331,434 | B2 * | 2/2008 | Steinbach | F16F 9/18 188/289 |
| 2006/0054435 | A1 * | 3/2006 | Yamaguchi | F16F 9/065 188/314 |
| 2011/0198787 | A1 | 8/2011 | Hamberg et al. | |
| 2012/0048665 | A1 | 3/2012 | Marking | |
| 2013/0341842 | A1 | 12/2013 | Weber | |
| 2014/0230939 | A1 | 8/2014 | Weber et al. | |
| 2014/0288776 | A1 | 9/2014 | Anderson et al. | |
| 2015/0076753 | A1 * | 3/2015 | Cotter | F16F 9/0236 267/124 |
| 2015/0226283 | A1 | 8/2015 | Marking | |
| 2016/0075205 | A1 | 3/2016 | Anderson et al. | |
| 2016/0290431 | A1 | 10/2016 | Marking | |
| 2016/0311446 | A1 | 10/2016 | Haller | |
| 2017/0225534 | A1 | 8/2017 | Anderson et al. | |
| 2018/0031071 | A1 | 2/2018 | Marking | |

FOREIGN PATENT DOCUMENTS

| | | |
|---|---|---|
| DE | 1 286 916 | 1/1969 |
| DE | 38 40 352 | 6/1990 |
| DE | 197 50 414 | 9/1998 |
| DE | 103 52 697 | 6/2005 |
| DE | 10 2007 025 733 | 12/2008 |
| DE | 10 2009 035 570 | 2/2011 |
| DE | 10 2011 010 070 | 8/2012 |
| DE | 10 2011 117 752 | 5/2013 |
| DE | 10 2013 110 920 | 4/2015 |
| DE | 10 2015 200 444 | 7/2016 |
| EP | 0 902 211 | 3/1999 |
| EP | 1 998 070 | 12/2008 |
| EP | 2 527 171 | 11/2012 |
| WO | 2017/010199 | 1/2017 |

\* cited by examiner

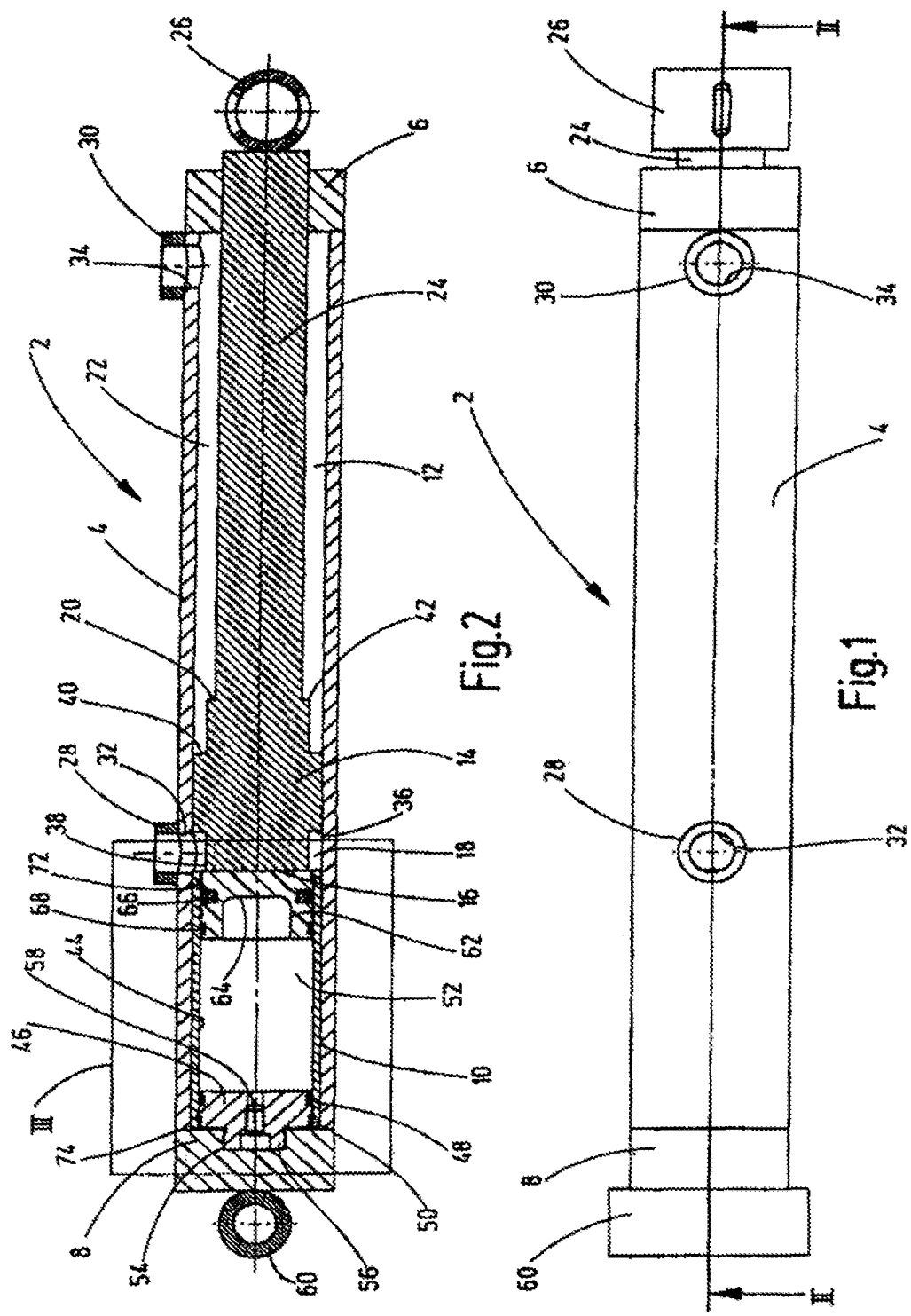

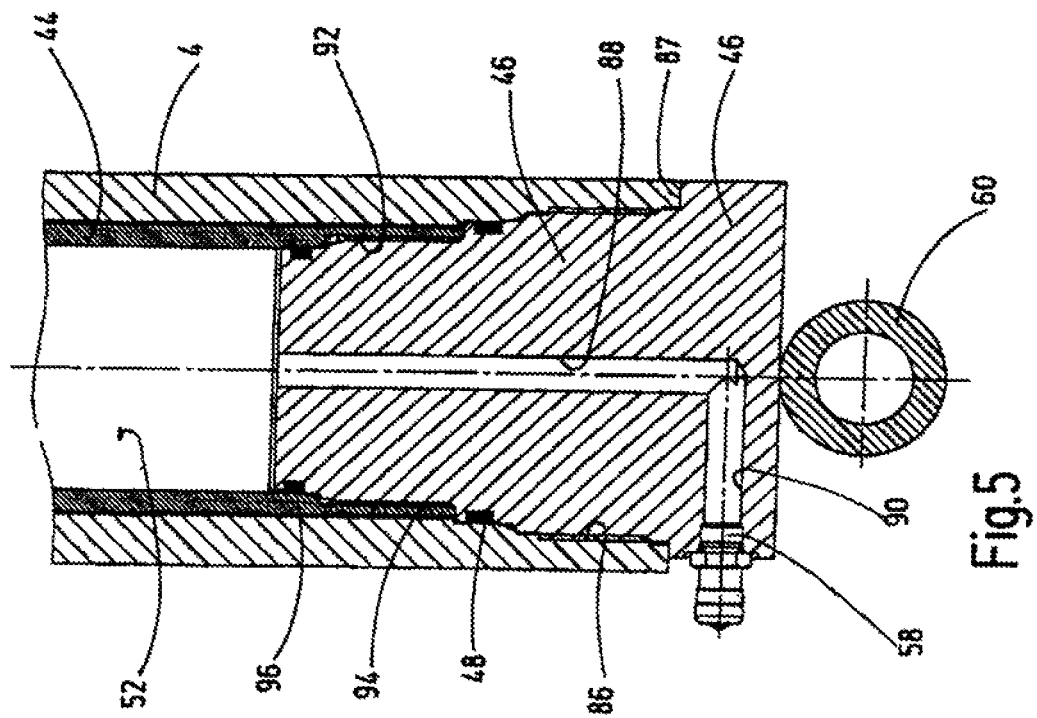
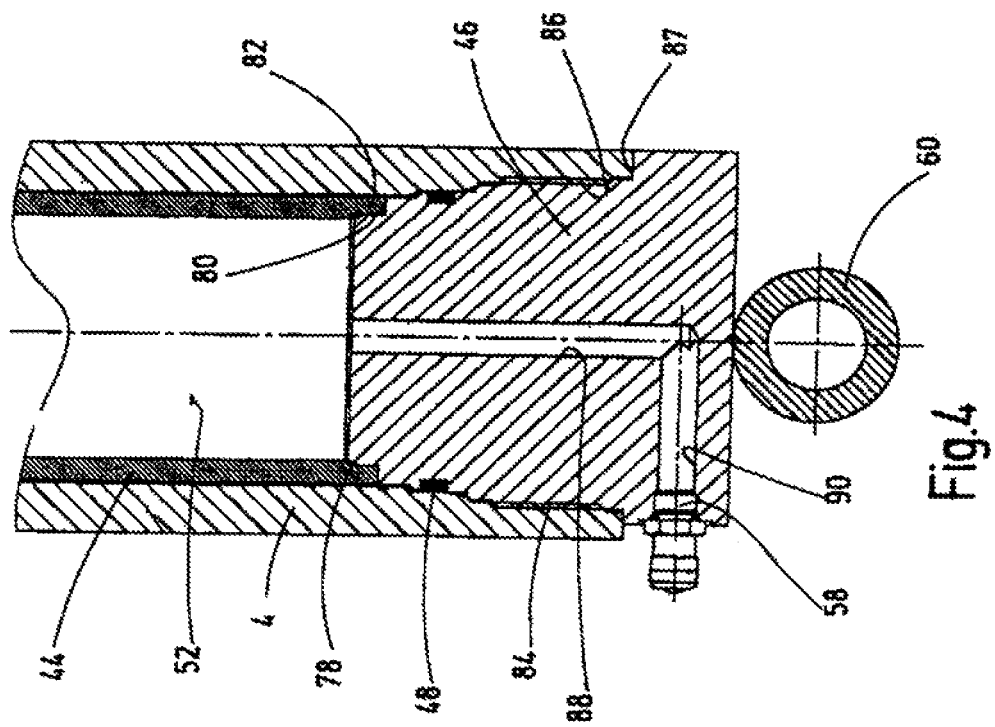

HYDROPNEUMATIC PISTON-CYLINDER ASSEMBLY

FIELD OF THE INVENTION

The invention concerns a hydro-pneumatic piston-cylinder assembly, in particular for use as suspension strut in vehicle suspension systems, comprising a cylinder housing and an axially displaceable, guided piston that is disposed inside the cylinder chamber of the cylinder housing, which is filled with hydraulic fluid. The piston is provided with a piston rod at one side of the piston. The piston rod extends out of one end of the cylinder chamber in a sealed manner. The hydraulic fluid, which is disposed inside the cylinder chamber on that side of the piston crown that faces away from the piston rod, may be brought into operative connection with a pneumatic spring accumulator.

BACKGROUND OF THE INVENTION

Axle suspensions with suspension struts that are formed through hydro-pneumatic piston-cylinder assemblies are well known and are often used in commercial vehicles. The prior art of a piston-cylinder assembly of the kind described above is shown in DE 10 2009 035 570 A1. The known piston-cylinder assembly is advantageous for use in axle suspensions because the direct operative connection between the hydraulic fluid in the cylinder chamber and the spring accumulator opens up the possibility of integrating the spring accumulator as a component in the piston-cylinder assembly. The omission of external accumulators makes a compact design possible, which favors the application in axle suspensions of vehicles that usually have limited installation space. The spring accumulator in the above-mentioned, known assembly is implemented as a diaphragm accumulator, which comprises an accumulator housing that is assembled from a first hemispherical housing shell and a second hemispherical housing shell, which are welded together. The second housing shell forms an end cap of the cylinder housing. The diaphragm is attached to the inner wall of the first housing shell. The pressure of the hydraulic fluid is applied to the side facing the piston, which acts upon the diaphragm from the direction of the cylinder chamber via an opening provided in the first housing shell.

The required manufacturing effort comprising the production of the hemispherical housing shells, the welding together of the shells, as well as the machining of an annular groove on the inside of the first shell for attaching the membrane by an attachment ring that covers the circumferential bead of the diaphragm, which is retained inside the annular groove, impedes the efficient and cost-effective manufacture of the known assembly.

SUMMARY OF THE INVENTION

Based upon the above-mentioned difficulties, an object of the invention to provide an improved piston-cylinder assembly of the kind described at the outset that is characterized by a design that is particularly simple, efficient and cost-effective to produce, while retaining the advantages of the described, known assembly.

This object is basically met according to the invention by a hydropneumatic piston-cylinder assembly having, as a significant feature of the invention, a spring accumulator being a piston accumulator disposed inside the cylinder housing of the assembly. Compared to the diaphragm accumulator of the known assembly, comprised of an accumulator housing formed by welded housing shells, together with the facility for retaining the diaphragm in the one housing shell, the piston accumulator provided by the invention is of a significantly simpler design. This simpler design only has a free piston guided inside the accumulator housing. The accumulator housing is of a simple cylindrical pipe with a bottom part that closes the accumulator housing at one end. With the low number of components, which are affordable as well as simple and efficient to produce, the manufacture of the piston accumulator is cost-effective, which results in low manufacturing costs for the entire assembly.

In particularly advantageous exemplary embodiments the piston accumulator, its accumulator housing fits inside the cylinder housing with the outer circumference of the accumulator housing. On assembly, the piston accumulator therefore only needs to be inserted from one end of the tubular cylinder housing into the cylinder housing. The installation of a complete piston accumulator into the respective cylinder housing also provides the advantageous option of producing the piston accumulator as a non-variable part for cylinder housings of varying suspension strut lengths. This structure means that only a single and relatively small accumulator has to be manufactured and approved according to the pressure vessel directive, which provides cost savings.

The assembly may advantageously be implemented such that at least in an initial position of the piston rod unit, formed by piston and piston rod, in which the piston rod unit is in a retracted position in the cylinder housing, the piston of the piston rod unit makes contact with its end face with the piston of the piston accumulator. With a fully retracted piston rod, this arrangement results in a minimal overall assembled length.

In advantageous exemplary embodiments, the piston accumulator is braced with a bottom part, which comprises a gas filling facility, at a bottom of the cylinder housing that forms the lower housing cover. In this instance, the assembly may advantageously be implemented such that, within the vicinity of the bottom-end bracing of the piston accumulator, the bottom of the cylinder housing is provided with a recess that accepts at least part of the protruding gas filling facility for the gas-end of the piston accumulator. The gas filing facility may comprise a filling valve of a commonly used design.

The piston of the piston accumulator may be retained inside the accumulator housing in its initial position, which corresponds to the largest volume of the gas end, by a retaining device, such as a circlip or snap ring.

To supply the cylinder chamber with pressurized hydraulic fluid, the cylinder chamber may be provided at each end with a fluid connection point through which the pressure level may be adjusted, as is common practice with suspension struts. The piston rod, when installed and under operational load, is then extended to the required degree to provide a suspension travel. To provide a fluid connection between the parts of the cylinder chamber that adjoin the one side and the other side of the piston, the fluid connection points are connected to each other by a line that comprises an orifice or a restricting device. The sizing of the orifice or retaining device determines the spring characteristic and spring damping effect of the assembly.

The assembly may advantageously be implemented such that one of the connection points feeds into a fluid chamber that forms part of the cylinder chamber. The fluid chamber remains in the initial position unoccupied by the two adjacently located, opposing pistons. Thus, the part of the cylinder chamber that adjoins the piston of the piston accumulator retains a residual volume, even in the instance where the piston rod unit is fully retracted.

To this end the assembly may be implemented such that, in the retracted initial position, the piston of the piston rod unit makes contact with the piston of the piston accumulator with an area that is smaller than the area of the front face of the piston of the piston accumulator.

The rod of the piston rod unit may advantageously be implemented in a stepped design in the direction of the other connection point in the cylinder housing. This measure forms a residual volume also in the cylinder chamber that adjoins this connection point in the instance of a fully extended end position of the piston rod.

In advantageous exemplary embodiments, the cylinder housing is provided with two housing covers, which, when removed from the cylinder housing, permit the insertion of piston rod unit and piston accumulator.

The assembly may advantageously be implemented such that the outer diameter of the piston of the piston rod unit is at its widest point is equal to the outer diameter of the accumulator housing of the piston accumulator.

Moreover, the assembly may be such that the accumulator housing of the piston accumulator protrudes, in its installed position, slightly into the housing bore of the one connection point. During the operational movement of the piston rod unit, this arrangement forms a leading edge for the flow of the hydraulic fluid.

In the assembly according to the invention the piston rod unit and the piston accumulator are replaceably retained inside the cylinder housing. The assembly according to the invention is therefore also characterized for its easy maintenance.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure:

FIG. 1 is a side view of a piston-cylinder assembly, reduce by a factor of 2.6 compared to the size of an actual assembly, according to an exemplary embodiment of the invention;

FIG. 2 is a side view in section of the exemplary embodiment taken along the line II-II of FIG. 1;

FIGS. 4 and 5 are partial side views in section of bottom sections of cylinder housings of piston-cylinder assemblies according to second and third exemplary embodiments, respectively, of the invention.

DETAILED DESCRIPTION OF THE INVENTION

Figure 3:
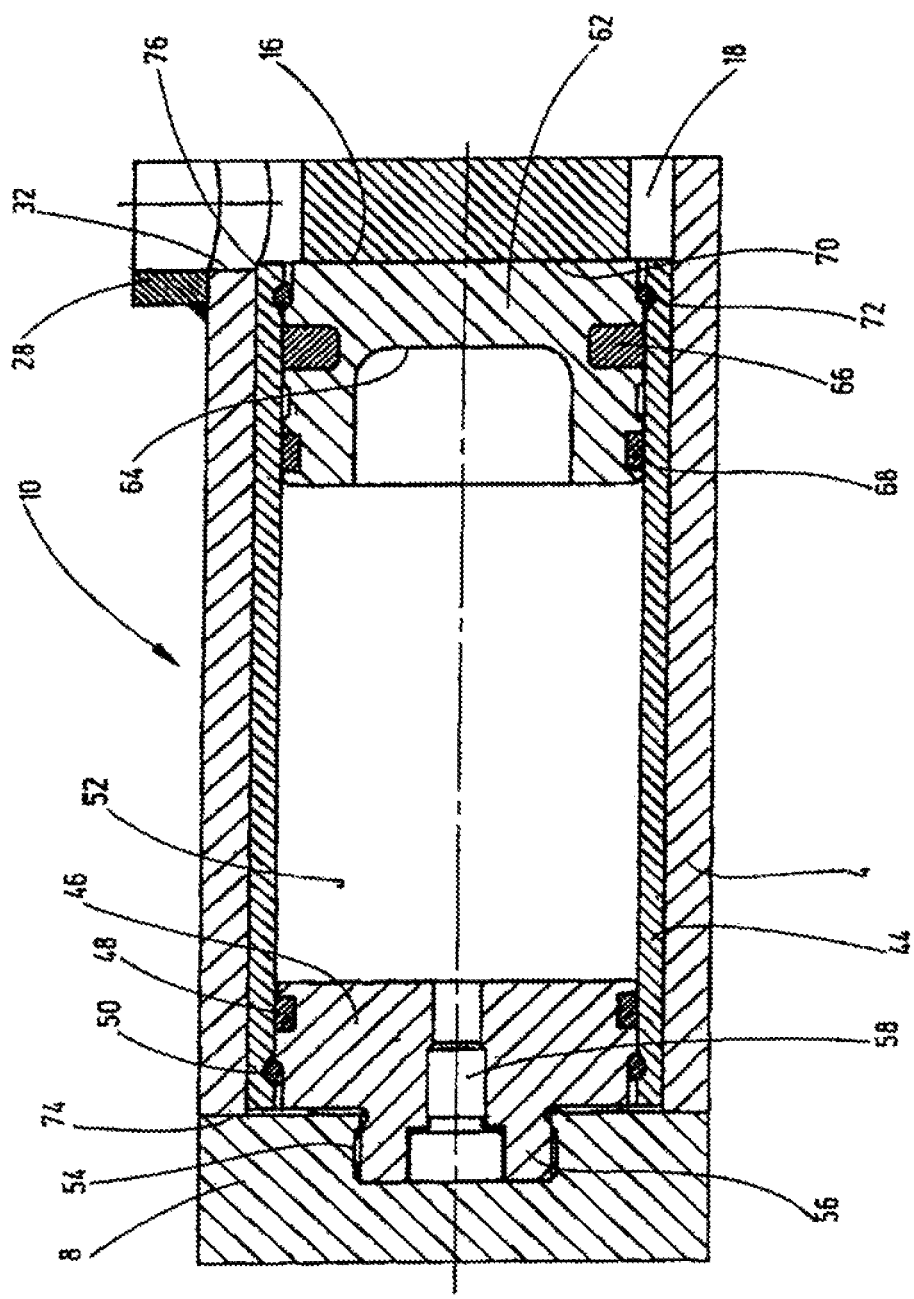
FIG. 3 is a partial side view in section of the area marked with III in FIG. 2 and shown enlarged.

The exemplary embodiments of the hydropneumatic piston-cylinder assembly 2 shown in the drawings are designed to be used as a shock absorber and vibration damper in vehicles. As is best seen from the cross-sectional depiction in FIG. 2, the assembly 2 is comprised of a cylinder housing 4 in form of a circular pipe body, which is closed at both ends by an upper housing cover 6 on the right-hand side, and by the opposite, bottom-end housing cover 8 on the left-hand side. The circular pipe body, which forms the accumulator housing 4 and which has the same internal and external diameter over its entire length, is subdivided into an accumulator section and a hydraulic section. More specifically, located adjacent to bottom-end housing cover 8 is a piston accumulator 10, which is then followed by a cylinder chamber 12 that extends to the upper housing cover 6. A piston 14 is moveably guided inside cylinder housing 4 and delimits with its one piston end 16, which faces piston accumulator 10, a first fluid chamber 18 as part of the cylinder chamber 12. The other piston end 20 delimits a second fluid chamber 22, which extends as the second part of cylinder chamber 12 to the upper housing cover 6. A piston rod 24, which is designed in one piece with piston 14 and which extends from the piston end 20, protrudes to the outside in a sealed manner through the upper housing cover 6 and is provided at its free end with an attachment element 26, which acts as pivot point for attachment to the chassis of a vehicle. For the supply of compressed hydraulic fluid the cylinder pipe of the accumulator housing 4 is provided at each end of the cylinder chamber 12 with a fluid connection point 28 and 30 each. The connection point 28 is provided with a connection bore 32 in the wall of the cylinder housing 4. Connection bore 32 is disposed at the transition between the first fluid chamber 18 of the cylinder chamber 12 and the piston accumulator 10. The connection bore 34 of the connection point 30 is disposed adjacent to the upper housing cover 6. At the piston end 16, which faces the piston accumulator 10, the piston 14 is provided with a step 36, which is disposed, from the front end face, at an axial distance that corresponds approximately to the diameter of the connection bore 32, and through which the diameter of the end section 38 of piston 14 reduces compared to its largest diameter and the internal diameter of the cylinder housing 4. At the other piston end 20, the piston 14 is provided with two further steps, of which the first step 40 has the same step height as step 36 at the piston end 16. The further step 42, which is displaced with respect to step 40 in the direction of the piston rod 24, has a smaller step height, which defines the outer diameter of the remaining part of the piston rod 24.

The piston accumulator 10 comprises an accumulator housing 44 in form of a circular pipe. The outer diameter of accumulator housing 44 corresponds to the inner diameter of the cylinder pipe of the cylinder housing 4 so that the accumulator housing 44 is in contact by its outer diameter with the inside of cylinder housing 4. At its bottom end, the accumulator housing 44 is closed through a bottom part 46, at which a sealing element 48 provides for a gas-tight seal towards the adjoining accumulator chamber 52. The bottom part 46 is axially secured inside accumulator housing 44 by a circlip or snap ring 50. Moreover, the bottom part 46 of the accumulator housing 44 is braced against the housing cover 8, which forms the bottom of the cylinder housing 4. The housing cover 8 is provided on the inside with an indent that forms a recess 54, into which a protruding end section 56 of a filling device or port 58 is screwed. Through filling device 58, the accumulator chamber 52 may be filled with a process gas, preferably $N_2$, at a filling pressure of, for example, 40 bar. While the filling device 58 is shown in the drawing in a simplified manner as a screw plug, alternatively, a filling valve of a commonly used kind may be provided. As shown in FIGS. 1 and 2, a tubular body 60 is welded to the outside of the bottom-end housing cover 8 for attachment to a vehicle, forming a bearing point.

The accumulator piston 62 is displaceably guided as a free-piston inside accumulator housing 44, and is provided, as is common practice for piston accumulators, with an internal, pot-like recess 64 on the side of the piston that faces the accumulator chamber 52, which stores part of the gas volume of the accumulator chamber 52. The circumference of the accumulator piston 62 is sealed against the accumulator housing 44 by a piston seal 66 and is guided by a guiding ring 68. The piston 14 of the piston rod unit and the accumulator piston 62 are shown in the drawings always in the initial starting position. The initial starting position, the cylinder chamber 12 is not under pressure, or is under such little pressure that the piston rod 24 is fully retracted under application of a load, and the end face of the piston side 16 is in contact with the end face 70 of the accumulator piston 62. In this operational state, accumulator piston 62 is in the fully extended position, which corresponds to the largest volume of the accumulator chamber 52. In this end position, the accumulator piston 62 is secured by a circlip 72, which is seated inside the accumulator housing. Due to the step 36, formed on the piston 14 of the piston rod unit, the diameter of the end face 16 of piston 14 is, shown in the initial position in which the end face 16 of piston 14 is in contact with the end face 70 of the accumulator piston 62, smaller than the diameter of the accumulator piston 62. Thus, in the first fluid chamber 18, which is assigned to the piston side 16, remains, also in the initial position shown, that is, with a fully retracted piston rod unit and at a fully extended initial position of the accumulator piston 62, a residual hydraulic fluid volume, which adjoins the connection bore 32 of the connection point 28. In the implementation variant shown in FIG. 3 the length of the accumulator housing 44 is slightly greater than the length of the surrounding cylinder housing 4, measured from the bottom end 74 to the connection bore 32, so that the accumulator housing 44 is provided with a slight protrusion 76 (FIG. 3) into the connection bore 32. When the piston-cylinder assembly operates as a suspension strut, the cylinder chamber 12 is supplied via connection point 30 with hydraulic fluid at a pressure at which the piston rod unit 14, 24 is, at the given and in retraction-direction acting load due to the different sizes of active piston areas of piston side 16 and piston side 20, extended to such a degree that a desired suspension travel is available. In this instance the piston accumulator 10, which adjoins with its accumulator piston 62 the first fluid chamber 18 and is moveable through its fluid pressure against the gas preloading inside accumulator chamber 52, acts as spring accumulator with its compressible gas volume. Depending on the sizing of the restriction in the fluid connection (not shown) of the connecting points 28 and 30, the spring characteristics and damping effects can be set as required.

In the second exemplary embodiment shown in FIG. 4, the bottom part 46, which contains the filling device, forms at the same time the lower end cap of the cylinder housing 4, and thus, replaces the lower housing cover 8 of the previous exemplary embodiment. Accordingly, the tubular body 60, which serves as fastening element, is welded directly to bottom part 46. The bottom part 46 has a greater axial length than the bottom part 46 of the first exemplary embodiment and, likewise, is sealed by a sealing element 48 with respect to the cylinder housing 4. Contrary to the first exemplary embodiment, the accumulator housing 44 is not secured by a circlip 50 at the bottom part 46, but is fixed by a welding connection 78. The welding connection is located at an end section 80, which has a reduced outer diameter where the accumulator housing 44 engages with that end section 80 with an end rim 82 that has a reduced inner diameter. Starting from the lower free end, the cylinder housing 4 is provided with a threaded section 84 with a reduced internal diameter for a screw connection with an external thread 86 of the bottom part 46. Serving as the axial end stop for the threaded connection is a step 87 in bottom part 46 with which the end of the cylinder housing 4 makes contact. To connect the accumulator chamber 52 with the filling device, which is provided in form of a fill valve 58, a longitudinal channel 88, which ends inside the accumulator chamber 52, as well as a subsequent transverse channel 90, which leads to the laterally-positioned fill valve 58, is formed in bottom part 46.

The third exemplary embodiment according to FIG. 5 differs from the second exemplary embodiment in that the bottom part 46, which is even longer in axial direction, is not welded to the accumulator housing 44, but is attached with a threaded connection. To this end an external thread 92 is provided at the end section of bottom part 46, which has a reduced outer diameter. The reduced outer diameter is screwed together with the internal thread in end section 94 of cylinder housing 44, which has a reduced inner diameter. A further sealing ring 96 is provided in the vicinity of the axial inner end of bottom part 46, which provided a seal in the non-reduced section of the cylinder housing 44.

While various embodiments have been chosen to illustrate the invention, it will be understood by those skilled in the art that various changes and modifications can be made therein without departing from the scope of the invention as defined in the claims.

The invention claimed is:

1. A hydropneumatic piston-cylinder assembly, comprising:
   a cylinder housing having a hydraulic fluid-filled cylinder chamber therein, having a longitudinal axis, and having a first connection point with an opening diameter;
   a hydraulic piston axially displaceable along said longitudinal axis and guided in said cylinder chamber, said hydraulic piston having a first piston side with a piston rod extending from said hydraulic piston and out an end of said cylinder chamber in a sealed manner and having a piston crown on a second piston side opposite said first piston side, said first and second piston sides being exposed to hydraulic fluid in said cylinder chamber;
   a pneumatic spring piston accumulator being engagable with said piston crown and being located in said cylinder housing;
   a first step being on said hydraulic piston at an axial distance along said longitudinal axis from a front end face of said piston crown and facing said piston accumulator, said first step having a reduced transverse diameter compared to a largest transverse diameter of said hydraulic piston, said first step having a first step height in a radial direction of said longitudinal axis and being spaced from a front face surface of said opening diameter; and
   a second step being on said hydraulic piston on said first piston side, said second step having a second step height in a radial direction of said longitudinal axis smaller that said first step height and defining an outer diameter of said piston rod.

2. A hydropneumatic piston-cylinder assembly according to claim 1 wherein
   said piston accumulator comprises an accumulator housing fitting inside said cylinder housing with an outer circumference of said accumulator housing.

3. A hydropneumatic piston-cylinder assembly according to claim 2 wherein
   said piston rod is extendable by application of a predetermined operating pressure to said cylinder chamber; and an accumulator piston of said piston accumulator is pretensioned by gas pressure of an operating gas inside said accumulator housing.

4. A hydropneumatic piston-cylinder assembly according to claim 2 wherein
said hydraulic piston has an outer diameter at a widest point thereof equal to an outer diameter of said accumulator housing of said piston accumulator.

5. A hydropneumatic piston-cylinder assembly according to claim 2 wherein
said accumulator housing protrudes in an installed position thereof with an overhang into a housing bore forming a fluid connection point in said cylinder housing.

6. A hydropneumatic piston-cylinder assembly according to claim 1 wherein
said piston crown contacts an accumulator piston of said piston accumulator in an initial position of said piston rod with said piston rod in a retracted position in said cylinder housing.

7. A hydropneumatic piston-cylinder assembly according to claim 6 wherein
said accumulator piston is retained in the initial position in an accumulator housing of said piston accumulator by a retainer.

8. A hydropneumatic piston-cylinder assembly according to claim 7 wherein
said retainer is a circlip.

9. A hydropneumatic piston-cylinder assembly according to claim 6 wherein
said piston crown contacts said accumulator piston with contact area smaller than an area of a front face of said accumulator piston facing said piston crown.

10. A hydropneumatic piston-cylinder assembly according to claim 1 wherein
said cylinder chamber comprises a second fluid connection point in addition to said first connection point at axial ends thereof capable of supplying fluid pressure to extend and retract said piston rod relative to said cylinder housing.

11. A hydropneumatic piston-cylinder assembly according to claim 10 wherein
said first fluid connection point opens into fluid chamber forming part of said cylinder chamber between said piston crown and said piston accumulator, said fluid chamber being free of fluid pressure when said hydraulic piston is adjacent an accumulator piston of said piston accumulator.

12. A hydropneumatic piston-cylinder assembly according to claim 11 wherein
said piston rod has a step-shaped outer surface in a direction of said second connection point.

13. A hydropneumatic piston-cylinder assembly according to claim 1 wherein
a bottom part of said piston accumulator braces said piston accumulator against a lower housing cover at a bottom of said cylinder housing and comprises a gas filling port.

14. A hydropneumatic piston-cylinder assembly according to claim 13 wherein
said lower housing cover comprises a recess receiving a part of a gas filler for said filling port at a gas end of said piston accumulator.

15. A hydropneumatic piston-cylinder assembly according to claim 1 wherein
said cylinder housing has first and second removable covers at opposite ends thereof permitting insertion of said hydraulic piston in said cylinder housing when said first and second removable covers are removed.

16. A hydropneumatic piston-cylinder assembly according to claim 1 wherein
said hydraulic piston and said piston accumulator are releasably retained in said cylinder housing.

17. A hydropneumatic piston-cylinder assembly, comprising:
a cylinder housing having a hydraulic fluid-filled cylinder chamber therein, having a longitudinal axis, and having a first connection point with an opening diameter;
a hydraulic piston axially displaceable along said longitudinal axis and guided in said cylinder chamber, said hydraulic piston having a first piston side with a piston rod extending from said hydraulic piston and out an end of said cylinder chamber in a sealed manner and having a piston crown on a second piston side opposite said first piston side, said first and second piston sides being exposed to hydraulic fluid in said cylinder chamber, said hydraulic piston having an outer diameter at a widest point thereof; and
a pneumatic spring accumulator being engagable with said piston crown and being located in said cylinder housing and having an accumulator piston with an outer diameter equal to said widest point of said outer diameter of said hydraulic piston.

18. A hydropneumatic piston-cylinder assembly, comprising:
a cylinder housing having a hydraulic fluid-filled cylinder chamber therein, having a longitudinal axis, and having a first connection point with an opening diameter;
a hydraulic piston axially displaceable along said longitudinal axis and guided in said cylinder chamber, said hydraulic piston having a first piston side with a piston rod extending from said hydraulic piston and out an end of said cylinder chamber in a sealed manner and having a piston crown on a second piston side opposite said first piston side, said first and second piston sides being exposed to hydraulic fluid in said cylinder chamber; and
a pneumatic spring accumulator being engagable with said piston crown and being located in said cylinder housing, said piston accumulator having an accumulator housing being inside said cylinder housing and protruding in an installed position thereof with an overhang into a housing bore forming a fluid connection point in said cylinder housing.

19. A hydropneumatic piston-cylinder assembly, comprising:
a cylinder housing having a hydraulic fluid-filled cylinder chamber therein, having a longitudinal axis, and having a first connection point with an opening diameter;
a hydraulic piston axially displaceable along said longitudinal axis and guided in said cylinder chamber, said hydraulic piston having a first piston side with a piston rod extending from said hydraulic piston and out an end of said cylinder chamber in a sealed manner and having a piston crown on a second piston side opposite said first piston side, said first and second piston sides being exposed to hydraulic fluid in said cylinder chamber;
a pneumatic spring accumulator being engagable with said piston crown and being located in said cylinder housing and having an accumulator housing inside said cylinder housing, with an accumulator piston movable inside said accumulator housing, said accumulator housing being in said cylinder housing; and a single bottom part closing and sealed to bottom ends of said cylinder housing and said accumulator housing, a bottom end portion of said accumulator housing extending into an axially extending recess in said bottom part.

* * * * *